United States Patent
Eguchi (10) Patent No.: US 6,958,866 B2
(45) Date of Patent: Oct. 25, 2005

(54) ZOOM LENS SYSTEM

(75) Inventor: Masaru Eguchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 315 days.

(21) Appl. No.: 10/161,732

(22) Filed: Jun. 5, 2002

(65) Prior Publication Data

US 2002/0196559 A1 Dec. 26, 2002

(30) Foreign Application Priority Data

Jun. 8, 2001 (JP) .................................. 2001-173825

(51) Int. Cl.$^7$ ................................................ G02B 15/14
(52) U.S. Cl. ................................. 359/689; 359/683
(58) Field of Search ........................ 359/689, 683, 359/676, 686

(56) References Cited

U.S. PATENT DOCUMENTS

| | | | |
|---|---|---|---|
| 4,978,204 A | 12/1990 | Ito ............................. | 359/689 |
| 4,983,027 A | 1/1991 | Kojima et al. ............. | 359/689 |
| 5,434,711 A | 7/1995 | Tetsuya et al. ............ | 359/689 |
| 5,566,026 A | 10/1996 | Yoon ......................... | 359/689 |
| 5,572,365 A * | 11/1996 | Ito ............................. | 359/677 |
| 5,793,533 A | 8/1998 | Yoneyama et al. ........ | 359/689 |
| 5,793,535 A | 8/1998 | Ito et al. .................... | 359/689 |
| 5,838,500 A | 11/1998 | Ito et al. .................... | 359/689 |
| 5,956,185 A | 9/1999 | Kang .......................... | 359/689 |
| 5,969,880 A | 10/1999 | Hasushita et al. .......... | 359/689 |
| 6,002,529 A | 12/1999 | Kohno et al. ............... | 359/686 |
| 6,061,187 A * | 5/2000 | Kang .......................... | 359/689 |
| 6,433,940 B1 * | 8/2002 | Hankawa et al. ........... | 359/689 |

FOREIGN PATENT DOCUMENTS

| | | |
|---|---|---|
| JP | 2-135312 | 5/1990 |
| JP | 6-265787 | 9/1994 |
| JP | 8-179215 | 7/1996 |
| JP | 9-179028 | 7/1997 |
| JP | 10260354 | 9/1998 |

OTHER PUBLICATIONS

English Language Abstract of JP 2–135312, May 24, 1990.
English Language Abstract of JP 8–179215.
English Language Abstract of JP 9–179028.
English Language Abstract of JP 10–260354.

* cited by examiner

Primary Examiner—Jordan M. Schwartz
(74) Attorney, Agent, or Firm—Greenblum & Bernstein P.L.

(57) ABSTRACT

A zoom lens system includes a positive first lens group, a positive second lens group, a diaphragm, and a negative third lens group. The first through third lens groups move in an optical axis direction for zooming. The positive first lens group includes a negative lens element, and at least one positive lens element. The negative lens element is positioned at the most object-side of the positive first lens group, and is provided with a concave surface on the object-side surface thereof. The zoom lens system satisfies a number of specified conditions.

13 Claims, 7 Drawing Sheets

-1   1
SPHERICAL
ABERRATION

CHROMATIC
ABERRATION

—— d Line
······ g Line
---- C Line

Fig. 2B
W=28.3

-0.05  0.05
LATERAL
CHROMATIC
ABERRATION

Fig. 2C
W=28.3

-1   1
ASTIGMATISM

-3 (%) 3
DISTORTION

Fig. 3A
1:9.9

— d Line
······ g Line
--- C Line

-1    1
SPHERICAL
ABERRATION

CHROMATIC
ABERRATION

Fig. 3B
W=11.3

-0.05  0.05
LATERAL
CHROMATIC
ABERRATION

-1    1
ASTIGMATISM

Fig. 3D
W=11.3

-3 (%) 3
DISTORTION

Fig. 4A
1:12.8

— d Line
······ g Line
--- C Line

-1    1
SPHERICAL
ABERRATION

CHROMATIC
ABERRATION

Fig. 4B
W=6.3

-0.05  0.05
LATERAL
CHROMATIC
ABERRATION

-1    1
ASTIGMATISM

Fig. 4D
W=6.3

-3 (%) 3
DISTORTION

—— d Line
······ g Line
---- C Line

-1    1
SPHERICAL
ABERRATION

CHROMATIC
ABERRATION

Fig. 6B
W=28.3

-0.05  0.05
LATERAL
CHROMATIC
ABERRATION

-1    1
ASTIGMATISM

Fig. 6D
W=28.3

-3 (%) 3
DISTORTION

Fig. 7A
1:10.0

-1  1
SPHERICAL
ABERRATION

CHROMATIC
ABERRATION

— d Line
····· g Line
---- C Line

Fig. 7B
W=11.3

-0.05  0.05
LATERAL
CHROMATIC
ABERRATION

-1  1
ASTIGMATISM

Fig. 7D
W=11.3

-3 (%) 3
DISTORTION

Fig. 8A
1:12.9

-1  1
SPHERICAL
ABERRATION

CHROMATIC
ABERRATION

— d Line
····· g Line
---- C Line

Fig. 8B
W=6.3

-0.05  0.05
LATERAL
CHROMATIC
ABERRATION

-1  1
ASTIGMATISM

Fig. 8D
W=6.3

-3 (%) 3
DISTORTION

ZOOM LENS SYSTEM

BACKGROUND OF THE INVENTION

1. Field of the Invention

The present invention relates to a zoom lens system for a compact camera.

2. Description of the Prior Art

A zoom lens system for a compact camera does not require a long back focal distance, unlike a zoom lens system for a single lens reflex camera which requires a space, behind the photographing lens system, in order to provide a quick-return mirror. Accordingly, a retrofocus-type lens system having a negative lens group and a positive lens group, in this order from the object, is employed in a single lens reflex camera, whereas a telephoto-type lens system having a positive lens group and a negative lens group, in this order from the object, is generally employed in a compact camera.

In a zoom lens system of a telephoto-type, in order to increase the zoom ratio, a three-lens-group arrangement is employed. More specifically, the positive lens group on the object side is divided into two lens groups so that the zoom lens system has the three lens groups in total, i.e., a positive lens group, the other positive lens group, and the negative lens group, in this order from the object. It is noted that a zoom lens system of this telephoto three-lens-group type is widely used. In such a three-lens-group zoom lens system, by varying the distance between the positive first lens group and the positive second lens group, the zoom ratio of the entire zoom lens system can be increased while mainly field curvature is corrected. Furthermore, since there are more distance parameters than in the case of a zoom lens system of a two-lens-group arrangement, the overall length of the three-lens-group arrangement can be maintained relatively shorter even if the zoom ratio is increased.

However, in such a three-lens-group arrangement, if the zoom ratio is increased while the overall length thereof is maintained shorter at the long focal length extremity, aberration fluctuations due to zooming are made larger, so that the correcting of aberrations over the entire focal length range becomes difficult. In particular, chromatic aberration at the short focal length extremity and the long focal length extremity occur in opposite directions, so that the correcting of chromatic aberration over the entire focal length range becomes difficult.

Furthermore, in a case where a diaphragm is provided between lens elements constituting the positive second lens group in a zoom lens system of a three-lens-group arrangement, the diameter of the front (positive first) lens group can advantageously be reduced. However, since the positive second lens group suffers greatly from deterioration on the image-forming performance due to manufacturing error, higher precision is required therein with respect to the distance and decentration between a front portion of the positive second lens group before the diaphragm, and a rear portion thereof behind the diaphragm. Consequently, the production costs increase, and/or the mechanical structure becomes more complicated, so that the overall size of the zoom lens system increases.

SUMMARY OF THE INVENTION

The present invention is to provide a zoom lens system of a three-lens-group arrangement, which can achieve a zoom ratio of 4.5 or more, and can avoid increasing the thickness of the camera body by reducing the thickness of the lens groups. Furthermore, the present invention is to provide a zoom lens system of a three-lens-group arrangement, which can be miniaturized with respect to both the overall length and diameter thereof by suitably determining the power of each lens group, in order to reduce the overall length of the zoom lens system.

In addition to the above, it should be noted that the present invention is applied to a retractable lens-shutter camera in which the diameters of the front lens group and that of the rear lens group are smaller, and the number of lens elements is smaller, which can satisfy the following numerical conditions:

(1) When the zoom ratio Z is larger than 4.5, Z=fT/fW;

(2) The overall length TLt of the zoom lens system at the long focal length extremity is TLt/fT<0.8.

wherein $TL_T$ designates the distance, along the optical axis at the long focal length extremity, from the most object-side surface of the zoom lens system to the image plane.

According to the present invention, there is provided a zoom lens system including a first lens group having a positive refractive power (hereinafter, a positive first lens group), a second lens group having a positive refractive power (hereinafter, a positive second lens group), a diaphragm, and a third lens group having a negative refractive power (hereinafter, a negative third lens group), in this order from the object. Each of the first through third lens groups move in an optical axis direction in order to perform zooming. The positive first lens group includes a negative lens element, and at least one positive lens element. The negative lens element is positioned at the most object-side of the positive first lens group, and is provided with a concave surface on the object-side surface thereof. Furthermore, the zoom lens system satisfies the following conditions:

$$-1.0 < r1/fW < -0.5 \tag{1}$$

$$45 < vp-vn \tag{2}$$

$$0.05 < LD2/fT < 0.09 \tag{3}$$

wherein r1 designates the radius of curvature of the object-side surface of the most object-side negative lens element in the positive first lens group;

fW designates the focal length of the entire zoom lens system at the short focal length extremity;

fT designates the focal length of the entire zoom lens system at the long focal length extremity;

vp designates the average Abbe number of the positive lens element in the positive first lens group;

vn designates the average Abbe number of the negative lens element in the positive first lens group; and LD2 designates the distance, along the optical axis in the positive second lens group, from the most object-side surface thereof to the most image-side surface thereof.

The zoom lens system of the present invention can satisfy the following conditions:

$$2.4 < fT/f1 < 3.5. \tag{4}$$

$$5.0 < fT/f2 < 7.0 \tag{5}$$

$$-12.0 < fT/f3 < -8.5 \tag{6}$$

wherein
- f1 designates the focal length of the positive first lens group;
- f2 designates the focal length of the positive second lens group; and
- f3 designates the focal length of the negative third lens group.

The positive first lens group can include a negative lens element having a concave surface on the object-side surface thereof, and a positive biconvex lens element, in this order from the object.

The negative third lens group can include a positive lens element having a convex surface on the image-side surface thereof, and a negative lens element having a concave surface on the object-side surface thereof, in this order from the object.

The zoom lens system of the present invention preferably satisfies the following condition:

$$z > 4.5 \quad (7)$$

wherein
Z=fT/fW.

Furthermore, the zoom lens system of the present invention can satisfy the following condition:

$$TL_T/fT < 0.8 \quad (8)$$

wherein
$TL_T$ designates the distance, along the optical axis at the long focal length extremity, from the most object-side surface of the zoom lens system to the image plane.

The present disclosure relates to subject matter contained in Japanese Patent Application No. 2001-173825 (filed on Jun. 8, 2001) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 13:
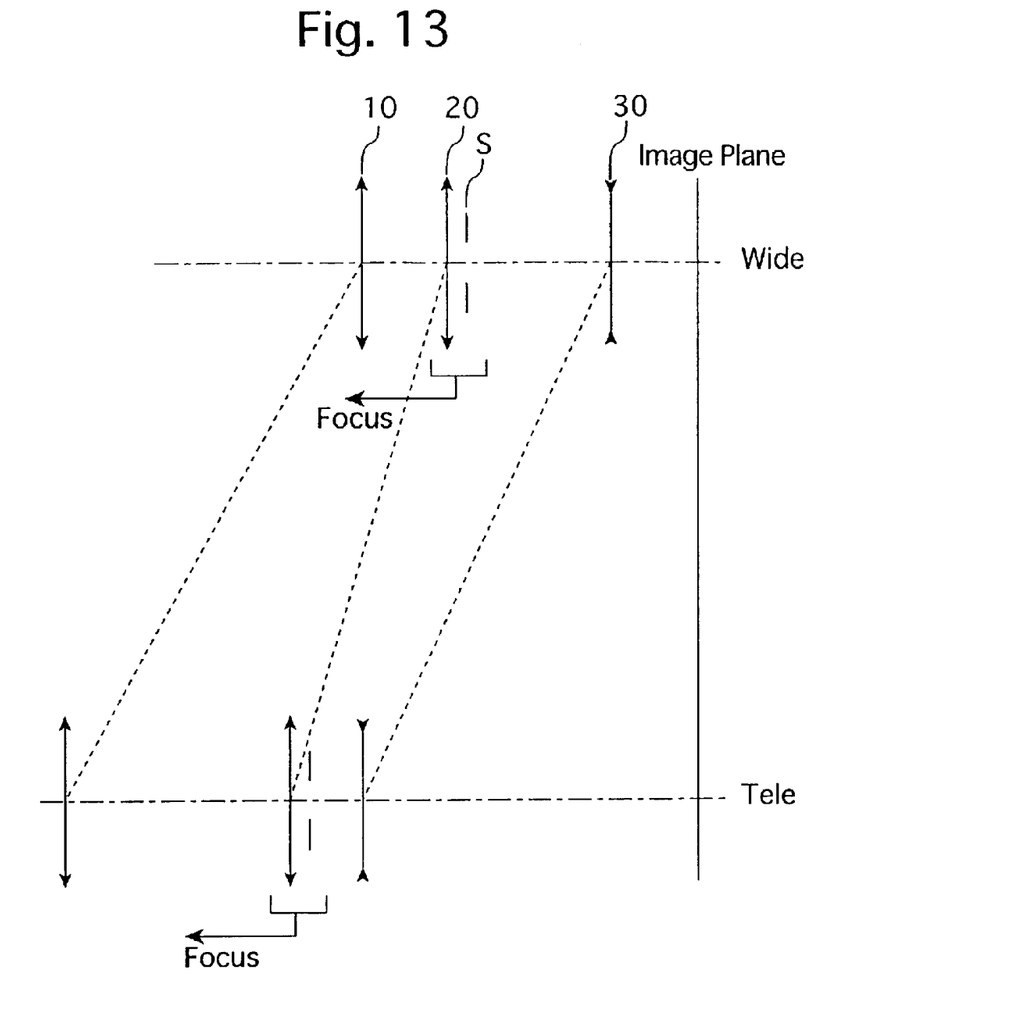
FIG. 13 shows a schematic lens-group moving paths of the zoom lens system according to the present invention.

The zoom lens system of the present invention, as shown in the schematic lens-group moving paths of FIG. 13, includes a positive first lens group 10, a positive second lens group 20, and a negative third lens group 30, in this order from the object. Upon zooming, the first through third lens groups are moved in the optical axis direction. More specifically, upon zooming from the short focal length extremity (W) to the long focal length extremity (T), the positive first lens group 10, the positive second lens group 20, and the negative third lens group 30 each monotonously move toward the object, and the relation on the traveling distances thereamong is as follows:

The traveling distance of the positive second lens group 20<the traveling distance of the negative third lens group 30<the traveling distance of the positive first lens group 10.

A diaphragm S is provided between the positive second lens group 20 and the negative third lens group 30, and integrally moves with the positive second lens group 20. Focusing is performed by moving the positive second lens group 20.

Condition (1) specifies the radius of curvature of the object-side concave surface (first surface) of the most object-side negative lens element in the positive first lens group 10.

If the power of the first surface becomes stronger (i.e., the radius of curvature becomes smaller) to the extent that r1/fW exceeds the upper limit of condition (1), the correcting of marginal aberrations becomes difficult.

If the power of the first surface becomes weaker (i.e., the radius of curvature becomes larger) to the extent that r1/fW exceeds the lower limit of condition (1), the effective diameter of this negative lens element becomes larger, so that it becomes impossible to achieve miniaturization of the positive first (positive front) lens group 10.

Condition (2) specifies the difference in the average values of Abbe numbers of the negative lens element and the positive lens element constituting the positive first lens group 10.

In order to achieve miniaturization, it is desirable for each lens group to be constituted by a smaller number of lens elements. Furthermore, in a zoom lens system with a higher zoom ratio, it is desirable to correct aberrations in each lens group. In particular, over the entire focal length range, in order to attain adequate optical performance, it is important to correct chromatic aberration in each lens group. For correcting chromatic aberration in the positive first lens group 10, it is desirable to make the negative first lens element from high dispersion glass, to make the positive second lens element from low dispersion glass, and to satisfy condition (2).

If (vp−vn) exceeds the lower limit of condition (2), chromatic aberration at the short focal length extremity and the long focal length extremity occur in the opposite directions, so that the correcting of chromatic aberration over the entire focal length range becomes difficult.

Condition (3) specifies the distance, along the optical axis in the positive second lens group, from the most object-side surface thereof to the most image-side surface thereof, i.e., the overall length of the positive second lens group 20, with respect to the focal length fT of the entire zoom lens system at the long focal length extremity.

The positive second lens group 20 is provided with the diaphragm S immediately therebehind. Over the entire zooming range from the short focal length extremity to the long focal length extremity, a bundle of axial light rays having a diameter always covering the full area of lens surface, and a bundle of marginal light rays overlapping the bundle of axial light rays pass through the positive second lens group 20. Therefore if an attempt is made to correct axial and marginal aberrations at the same time, the number of lens elements tends to increase, and the thickness of the positive second lens group 20 also tends to be thicker.

If LD2/fT exceeds the lower limit of condition (3), the positive second lens group 20 can be made thinner; however, the power of each lens element thereof becomes unnecessarily too strong for correcting axial and marginal aberrations. Accordingly, even if axial and marginal aberrations can be corrected to some extent at the design stage, deterioration on optical performance of the positive second lens group 20 due to manufacturing errors, such as decentration, is noticeable. As a result, aberration fluctuations upon zooming are increased.

If LD2/fT exceeds the upper limit of condition (3), the thickness of the positive second lens group 20 becomes too great, so that miniaturization of the camera becomes difficult.

Condition (4) specifies the positive refractive power of the positive first lens group 10 with respect to the focal length fT of the entire zoom lens system at the long focal length extremity.

If fT/f1 exceeds the lower limit of condition (4), the positive refractive power of the positive first lens group 10 becomes too weak, thereby, the overall length of the zoom lens system at the short focal length extremity becomes longer, and the traveling distance of the positive first lens group 10 upon zooming increases. Consequently, the entire length of the zoom lens system at the long focal length extremity increases. Furthermore, the power of the positive lens element of the positive first lens group 10 becomes too small, so that the correcting of chromatic aberration in the positive first lens group 10 becomes difficult.

If the positive refractive power of the positive first lens group 10 becomes strong to the extent that fT/f1 exceeds the upper limit of condition (4), the traveling distance of the positive first lens group 10 upon zooming can be made shorter. However, the positive lens element and the negative lens element, both of which constitute the positive first lens group 10, cancel out the large power, so that aberration fluctuations upon zooming are increased. This is because aberration fluctuations are caused by deterioration on optical performance due to manufacturing error such as decentration. Moreover, the power of the positive lens element becomes relatively too large, so that the correcting of chromatic aberration in the positive first lens group 10 is also difficult.

Condition (5) specifies the positive refractive power of the positive second lens group 20 with respect to the focal length fT of the entire zoom lens system at the long focal length extremity.

If the positive refractive power of the positive second lens group 20 becomes weaker to the extent that fT/f2 exceeds the lower limit of condition (5), the traveling distance of the positive second lens group 20 becomes longer in order to achieve a zoom ratio of 4.5 or more. As a result, the overall length of the zoom lens system at the long focal length extremity increases.

If the positive refractive power of the positive second lens group 20 becomes stronger to the extent that fT/f2 exceeds the upper limit of condition (5), the traveling distance of the positive second lens group 20 becomes shorter. However, aberration fluctuations upon zooming increase, and the correcting of aberrations over the entire focal length range becomes difficult.

Condition (6) specifies the negative refractive power of the negative third lens group 30 with respect to the focal length fT of the entire zoom lens system at the long focal length extremity.

If the negative refractive power of the negative third lens group 30 becomes weaker to the extent that fT/f3 exceeds the upper limit of condition (6), the back focal distance at the short focal length extremity becomes too short, so that the overall length of the zoom lens system at the short focal length extremity increases.

If the negative refractive power of the negative third lens group 30 becomes stronger to the extent that fT/f3 exceeds the lower limit of condition (6), the back focal distance at the short focal length extremity can be secured, and the overall length of the zoom lens system can be made shorter at the long focal length extremity. However, the correcting of aberrations in the negative third lens group 30 becomes difficult, so that image-forming performance over the entire zoom lens system deteriorates.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, w designates the half angle-of-view (°), r designates the radius of curvature, d designates the lens-element thickness or distance between lens elements, Nd designates the refractive index of the d-line, and v designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:
   c designates a curvature of the aspherical vertex (1/r);
   y designates a distance from the optical axis;
   K designates the conic coefficient; and
   A4 designates a fourth-order aspherical coefficient;
   A6 designates a sixth-order aspherical coefficient;
   A8 designates a eighth-order aspherical coefficient; and
   A10 designates a tenth-order aspherical coefficient.

Embodiment 1

Figure 1:
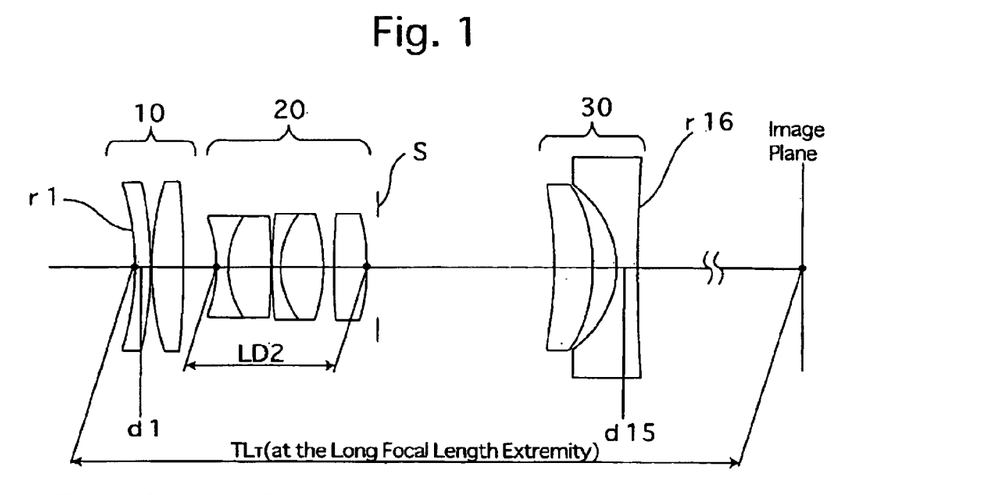
FIG. 1 is a lens arrangement of a zoom lens system according to a first embodiment of the present invention.
Figures 2A, 2B:
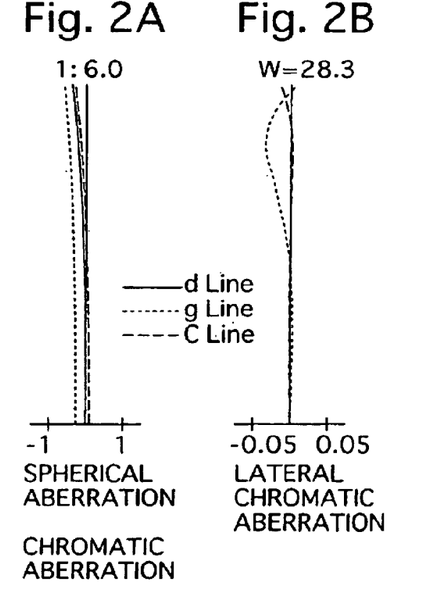
FIGS. 2A, 2B, 2C and 2D show aberrations occurred in the lens arrangement shown in FIG. 1 at the short focal length extremity.
Figure 2C:
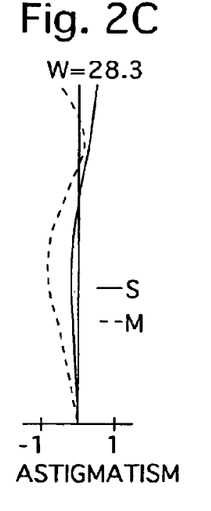
Figure 2D:
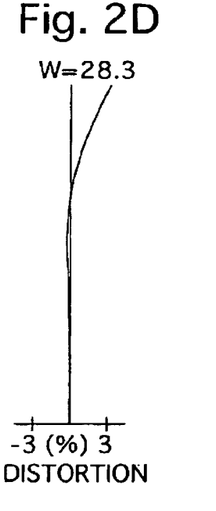
Figures 3A, 3B:
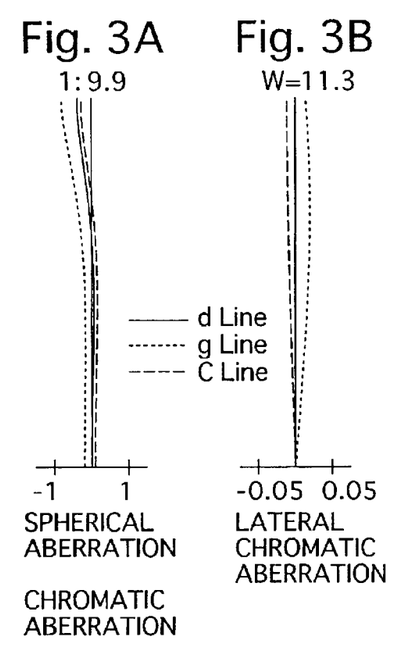
FIGS. 3A, 3B, 3C and 3D show aberrations occurred in the lens arrangement shown in FIG. 1 at an intermediate focal length.
Figure 3C:
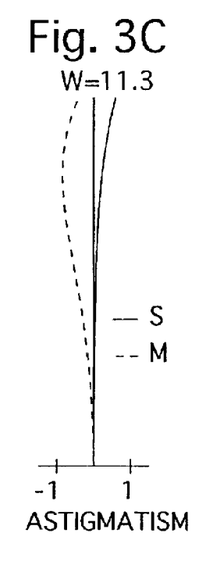
Figure 3D:
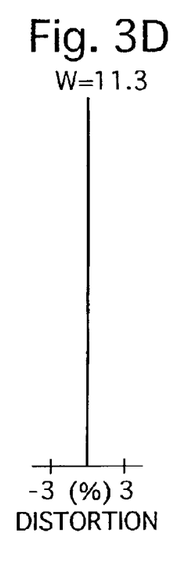
Figures 4A, 4B:
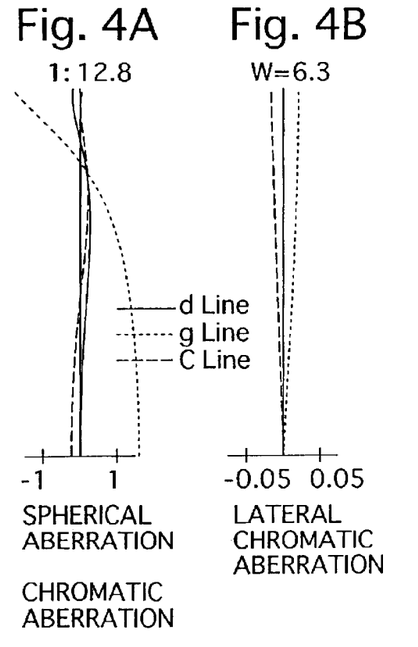
FIGS. 4A, 4B, 4C and 4D show aberrations occurred in the lens arrangement shown in FIG. 1 at the long focal length extremity.
Figure 4C:
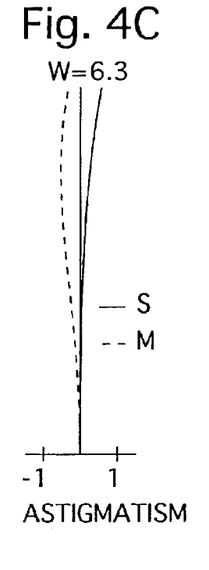
Figure 4D:
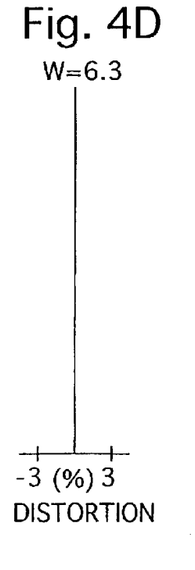

FIGS. 1 through 4D show the zoom lens system according to the first embodiment of the present invention. FIG. 1 is the lens arrangement of the zoom lens system. FIGS. 2A through 2D show aberrations occurred in the lens arrangement shown in FIG. 1 at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical data of the first embodiment. The positive first lens group 10 includes a negative meniscus lens element having the concave surface facing toward the object, and a positive lens element, in this order from the object. The positive second lens group 20 includes cemented lens elements having a positive lens element and a negative lens element, and a positive lens element, in this order from the object. The negative third lens group 30 includes a positive meniscus lens having the concave surface facing toward the object, and a negative biconcave lens element, in this order from the object. A diaphragm (iris diaphragm) S is provided 1.00 mm behind the second lens group 20 (i.e., behind surface No. 12).

TABLE 1

$F_{NO.}$ = 1:6.0–9.9–12.8
f = 38.95–108.21–197.28 (Zoom Ratio = 5.06)
W = 28.3°–11.3°–6.3°
$f_B$ = 8.53–45.09–81.09

| Surface No. | r | d | Nd | ν |
|---|---|---|---|---|
| 1 | −31.082 | 1.50 | 1.84666 | 23.8 |
| 2 | −41.448 | 0.10 | — | — |
| 3 | 32.756 | 2.99 | 1.49700 | 81.6 |
| 4 | −102.288 | 3.11–17.36–27.82 | — | — |
| 5 | −15.383 | 1.10 | 1.80400 | 46.6 |
| 6 | 10.466 | 4.02 | 1.84666 | 23.8 |
| 7 | −68.244 | 0.10 | — | — |
| 8 | 54.563 | 0.80 | 1.84666 | 23.8 |
| 9 | 9.932 | 3.99 | 1.58913 | 61.2 |
| 10 | −19.332 | 1.00 | — | — |
| 11 | 83.995 | 3.12 | 1.58913 | 61.2 |
| 12* | −24.572 | 17.87–8.71–4.53 | — | — |
| 13* | −57.726 | 3.60 | 1.84666 | 23.8 |
| 14* | −25.834 | 2.23 | — | — |
| 15 | −10.967 | 2.00 | 1.77250 | 49.6 |
| 16 | 195.313 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | −0.29116 × 10$^{-4}$ | −0.56216 × 10$^{-6}$ | 0.00 |
| 13 | 0.00 | −0.22984 × 10$^{-4}$ | −0.12180 × 10$^{-5}$ | 0.18278 × 10$^{-7}$ |
| 14 | 0.00 | −0.10139 × 10$^{-3}$ | −0.11224 × 10$^{-5}$ | 0.10207 × 10$^{-7}$ |

Embodiment 2

Figure 5:
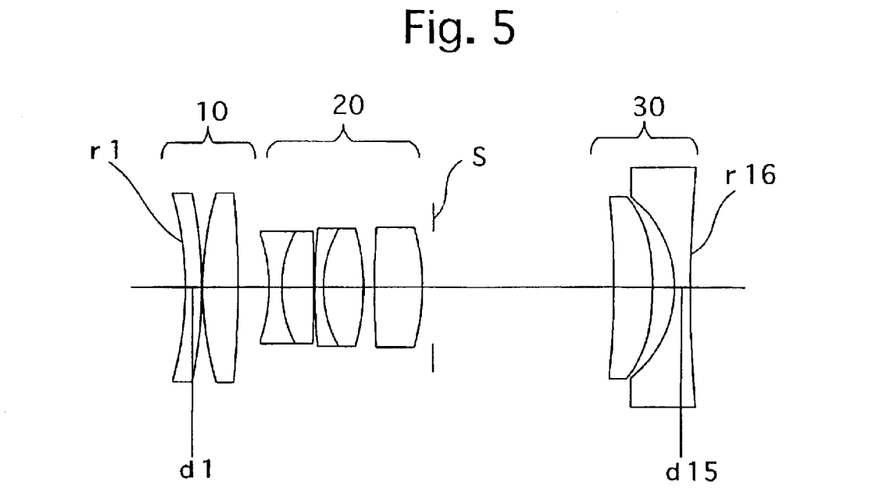
FIG. 5 is a lens arrangement of a zoom lens system according to a second embodiment of the present invention.
Figures 6A, 6B:
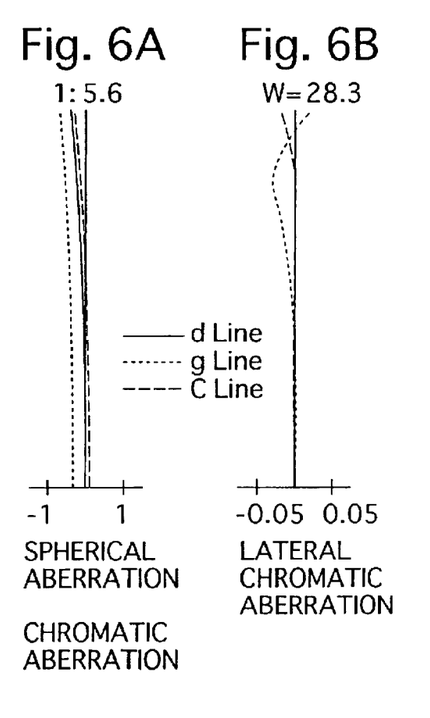
FIGS. 6A, 6B, 6C and 6D show aberrations occurred in the lens arrangement shown in FIG. 5 at the short focal length extremity.
Figure 6C:
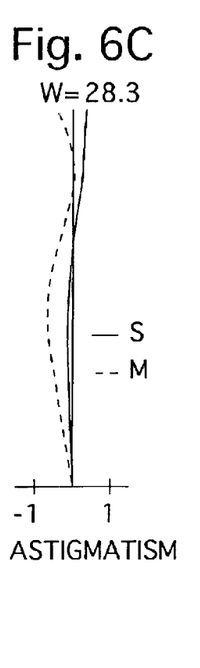
Figure 6D:
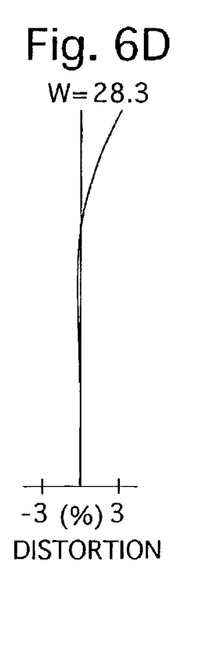
Figures 7A, 7B:
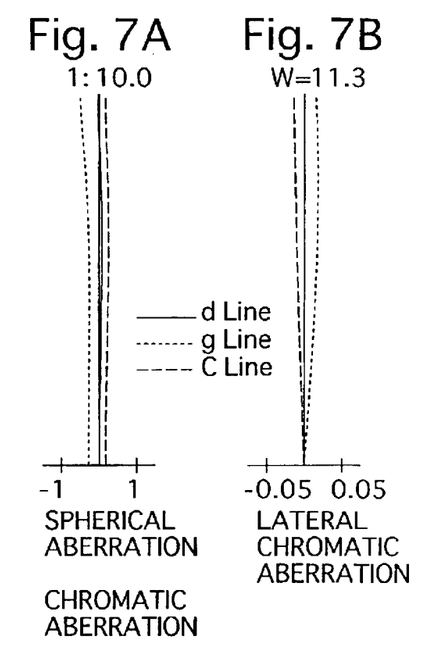
FIGS. 7A, 7B, 7C and 7D show aberrations occurred in the lens arrangement shown in FIG. 5 at an intermediate focal length.
Figure 7C:
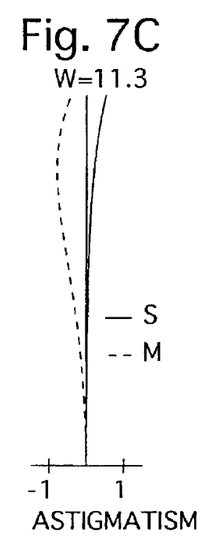
Figure 7D:
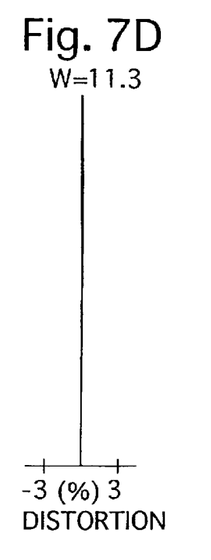
Figures 8A, 8B:
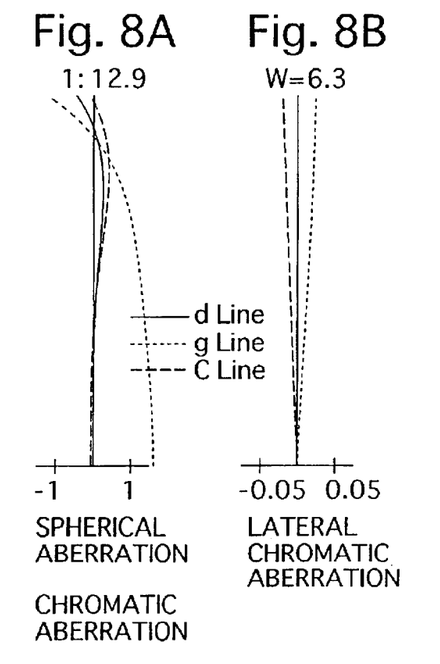
FIGS. 8A, 8B, 8C and 8D show aberrations occurred in the lens arrangement shown in FIG. 5 at the long focal length extremity.
Figure 8C:
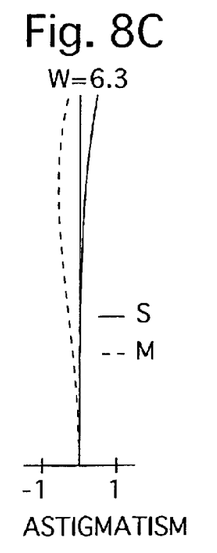
Figure 8D:
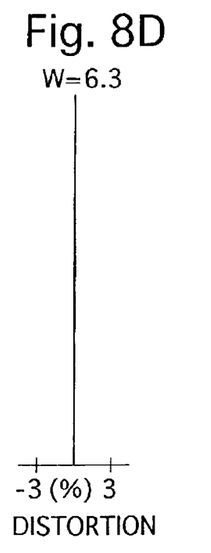

FIGS. 5 through 8D show the zoom lens system according to the second embodiment of the present invention. FIG. 5 is the lens arrangement of a zoom lens system. FIGS. 6A through 6D show aberrations occurred in the lens arrangement shown in FIG. 5 at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical data of the second embodiment. The basic lens arrangement of the second embodiment is the same as the first embodiment. A diaphragm (iris diaphragm) S is provided 1.00 mm behind the second lens group 20 (i.e., behind surface No. 12).

TABLE 2

$F_{NO.}$ = 1:5.6–10.0–12.9
f = 38.90–108.38–196.13 (Zoom Ratio = 5.04)
W = 28.3°–11.3°–6.3°
$f_B$ = 8.86–45.88–81.18

| Surface No. | r | d | Nd | ν |
|---|---|---|---|---|
| 1 | −31.546 | 1.50 | 1.84666 | 23.8 |
| 2 | −43.635 | 0.10 | — | — |
| 3 | 31.990 | 3.18 | 1.48749 | 70.2 |
| 4 | −95.898 | 2.83–17.00–27.92 | — | — |
| 5 | −15.467 | 1.16 | 1.80400 | 46.6 |
| 6 | 11.478 | 2.97 | 1.84666 | 23.8 |
| 7 | −103.478 | 0.06 | — | — |
| 8 | 56.759 | 0.80 | 1.84666 | 23.8 |
| 9 | 11.070 | 3.77 | 1.58913 | 61.2 |
| 10 | −19.700 | 1.00 | — | — |
| 11 | 85.211 | 4.50 | 1.58913 | 61.2 |
| 12* | −21.548 | 17.57–8.38–4.24 | — | — |
| 13* | −143.713 | 3.60 | 1.58547 | 29.9 |
| 14* | −26.872 | 2.07 | — | — |
| 15 | −10.674 | 1.50 | 1.72916 | 54.7 |
| 16 | 127.604 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | −0.12070 × 10$^{-4}$ | −0.34901 × 10$^{-6}$ | 0.00 |
| 13 | 0.00 | −0.25346 × 10$^{-4}$ | −0.13073 × 10$^{-5}$ | 0.18125 × 10$^{-7}$ |
| 14 | 0.00 | −0.15353 × 10$^{-3}$ | −0.13955 × 10$^{-5}$ | 0.96340 × 10$^{-8}$ |

Embodiment 3

Figure 9:
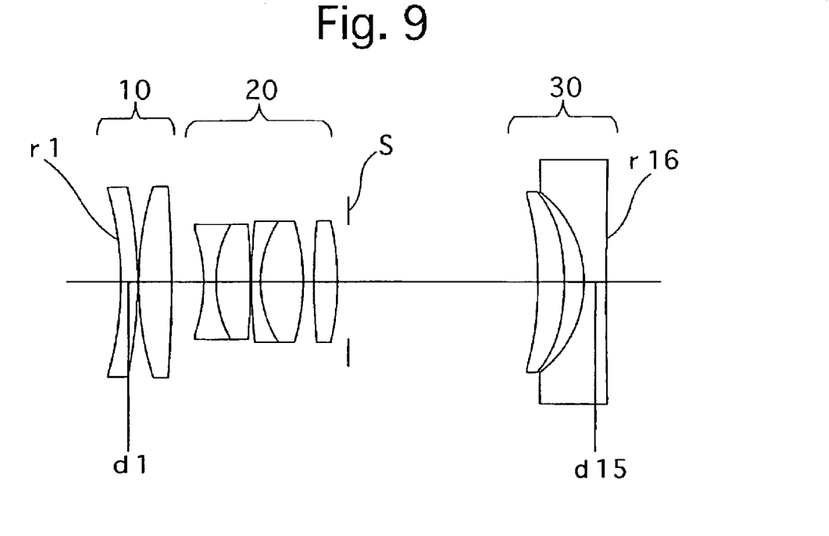
FIG. 9 is a lens arrangement of a zoom lens system according to a third embodiment of the present invention.
Figure 10A:
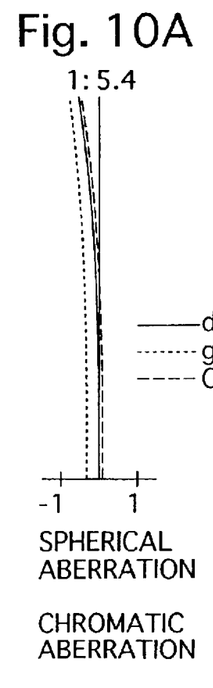
FIGS. 10A, 10B, 10C and 10D show aberrations occurred in the lens arrangement shown in FIG. 9 at the short focal length extremity.
Figure 10B:
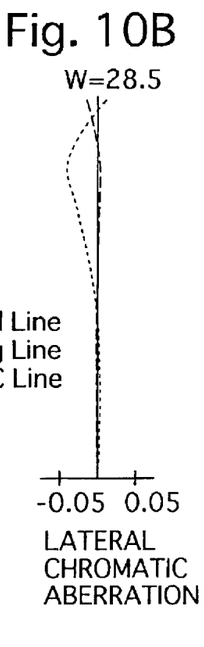
Figure 10C:
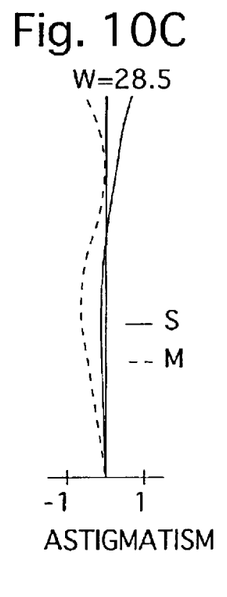
Figure 10D:
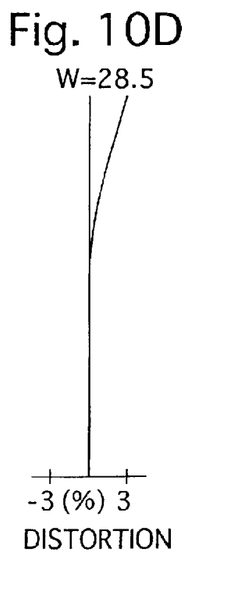
Figures 11A, 11B:
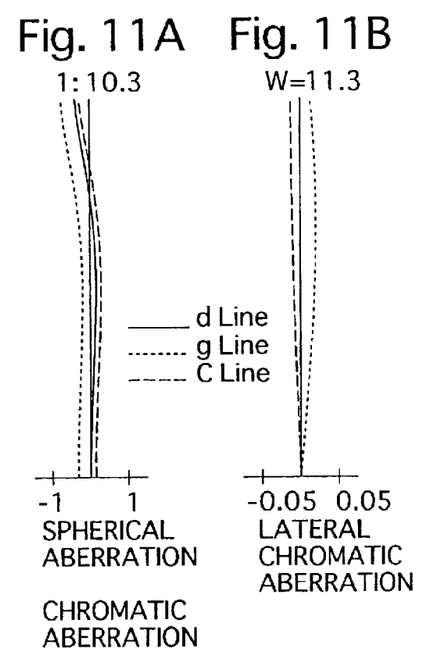
FIGS. 11A, 11B, 11C and 11D show aberrations occurred in the lens arrangement shown in FIG. 9 at an intermediate focal length.
Figure 11C:
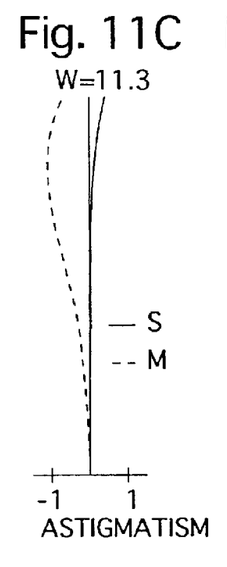
Figure 11D:
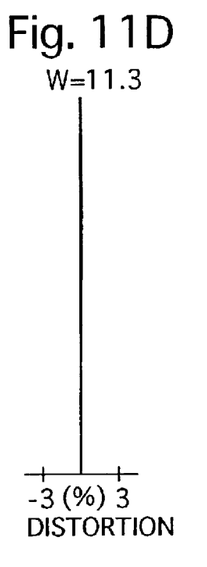
Figures 12A, 12B:
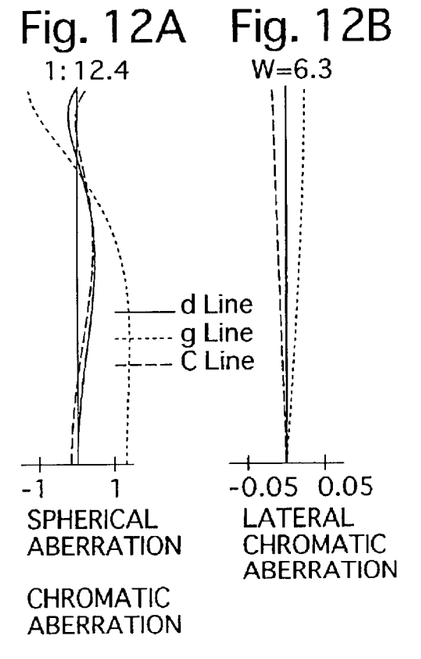
FIGS. 12A, 12B, 12C and 12D show aberrations occurred in the lens arrangement shown in FIG. 9 at the long focal length extremity.
Figure 12C:
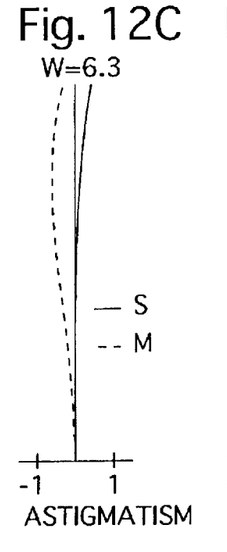
Figure 12D:
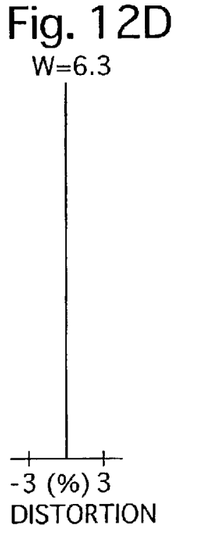

FIGS. 9 through 12D show the zoom lens system according to the third embodiment of the present invention. FIG. 9 is the lens arrangement of the zoom lens system. FIGS. 10A through 10D show aberrations occurred in the lens arrangement shown in FIG. 9 at the short focal length extremity. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical data of the third embodiment. The basic lens arrangement of the second embodiment is the same as the first embodiment. A diaphragm (iris diaphragm) S is provided 1.00 mm behind the second lens group 20 (i.e., behind surface No. 12).

TABLE 3

$F_{NO.}$ = 1:5.4–10.3–12.4
f = 38.74–107.90–195.45 (Zoom Ratio = 5.05)
W = 28.5°–11.3°–6.3°
$f_B$ = 8.51–44.70–80.07

| Surface No. | r | d | Nd | ν |
|---|---|---|---|---|
| 1 | −31.141 | 1.50 | 1.84666 | 23.8 |
| 2 | −41.480 | 0.10 | — | — |
| 3 | 29.647 | 2.99 | 1.49700 | 81.6 |
| 4 | −123.071 | 2.90–17.16–27.06 | — | — |
| 5 | −14.515 | 1.10 | 1.80400 | 46.6 |
| 6 | 11.241 | 3.12 | 1.84666 | 23.8 |
| 7 | −56.695 | 0.10 | — | — |

TABLE 3-continued $F_{NO.} = 1:5.4–10.3–12.4$
$f = 38.74–107.90–195.45$ (Zoom Ratio = 5.05)
$W = 28.5°–11.3°–6.3°$
$f_B = 8.51–44.70–80.07$

| Surface No. | r | d | Nd | ν |
|---|---|---|---|---|
| 8 | 53.126 | 0.80 | 1.84666 | 23.8 |
| 9 | 10.029 | 3.91 | 1.58913 | 61.2 |
| 10 | −19.842 | 1.00 | — | — |
| 11* | 72.378 | 2.18 | 1.58913 | 61.2 |
| 12* | 24.500 | 18.34–9.11–4.88 | — | — |
| 13* | 42.242 | 2.38 | 1.84666 | 23.8 |
| 14* | 22.223 | 1.86 | — | — |
| 15 | −10.531 | 2.00 | 1.77250 | 49.6 |
| 16 | 511.024 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 11 | 0.00 | $0.17094 \times 10^{-4}$ | $0.92005 \times 10^{-6}$ | 0.00 |
| 12 | 0.00 | $-0.12206 \times 10^{-4}$ | $0.30919 \times 10^{-6}$ | 0.00 |
| 13 | 0.00 | $-0.37649 \times 10^{-4}$ | $-0.18384 \times 10^{-5}$ | $0.23338 \times 10^{-7}$ |
| 14 | 0.00 | $-0.12025 \times 10^{-3}$ | $-0.17439 \times 10^{-5}$ | $0.13862 \times 10^{-7}$ |

The numerical values of each condition of each embodiment are shown in Table 4.

TABLE 4

| | Embod. 1 | Embod. 2 | Embod. 3 |
|---|---|---|---|
| Condition (1) | −0.798 | −0.811 | −0.804 |
| Condition (2) | 57.83 | 46.43 | 57.83 |
| Condition (3) | 0.072 | 0.073 | 0.062 |
| Condition (4) | 2.769 | 2.682 | 2.905 |
| Condition (5) | 6.265 | 6.178 | 6.131 |
| Condition (6) | −10.760 | −10.648 | −10.790 |
| Condition (7) | 5.06 | 5.04 | 5.05 |
| Condition (8) | 0.71 | 0.71 | 0.69 |

As can be understood from Table 4, each embodiment satisfies each condition. Furthermore, as can be understood from the aberration diagrams, the various aberrations are adequately corrected.

According to the above description, in a zoom lens system of a three-lens-group arrangement, i.e., a positive lens group, a positive lens group and a negative lens group in this order from the object, a zoom ratio of 4.5 or more can be achieved, while an increase of the thickness of the camera body can be prevented by reducing the thickness of the lens groups. Furthermore, according to the above description, a miniaturized zoom lens system, having a shorter overall length and smaller diameter thereof, for a compact camera with a higher zoom ratio can be obtained by suitably determining the power of each lens group.

What is claimed is:

1. A zoom lens system comprising a positive first lens group, a positive second lens group, a diaphragm, and a negative third lens group, in this order from an object,
   wherein each of said first through third lens groups move in an optical axis direction to perform zooming;
   wherein said positive first lens group comprises a negative lens element, and at least one positive lens element;
   wherein said negative lens element is positioned at the most object-side of said positive first lens group, and is provided with a concave surface on the object-side surface of said negative lens element; and
   wherein said zoom lens system satisfies the following conditions:

$$-0.85 < r1/fW < -0.5$$

$$45 < vp - vn$$

$$0.05 < LD2/fT < 0.09$$

wherein
   r1 designates the radius of curvature of the object-side surface of the negative lens element in said positive first lens group;
   fW designates the focal length of the entire zoom lens system at the short focal length extremity;
   fT designates the focal length of the entire zoom lens system at the long focal length extremity;
   vp designates the average Abbe number of said positive lens element in said positive first lens group;
   vn designates the average Abbe number of said negative lens element in said positive first lens group; and
   LD2 designates the distance, along the optical axis in the positive second lens group, from the most object-side surface thereof to the most image-side surface thereof.

2. The zoom lens system according to claim 1, further satisfying the following conditions:

$$2.4 < fT/f1 < 3.5$$

$$5.0 < fT/f2 < 7.0$$

$$-12.0 < fT/f3 < -8.5$$

wherein
   f1 designates the focal length of said positive first lens group;
   f2 designates the focal length of said positive second lens group; and
   f3 designates the focal length of said negative third lens group.

3. The zoom lens system according to claim 1, wherein said positive first lens group comprises a negative lens element having a concave surface on the object-side surface thereof, and a positive biconvex lens element, in this order from said object.

4. The zoom lens system according to claim 1, wherein said negative third lens group comprises a positive lens element having a convex surface on the image-side surface thereof, and a negative lens element having a concave surface on the object-side surface thereof, in this order from said object.

5. The zoom lens system according to claim 1, further satisfying the following condition:

$$Z > 4.5$$

wherein
   $Z = fT/fW$.

6. The zoom lens system according to claim 1, further satisfying the following condition:

$$TL_T/fT < 0.8$$

wherein
   $TL_T$ designates the distance, along the optical axis at the long focal length extremity, from the most object-side surface of said zoom lens system to the image plane.

7. The zoom lens system according to claim 1, further satisfying the following condition:

$$TL_T/fT<0.72$$

wherein
$TL_T$ designates the distance, along the optical axis at the long focal length extremity, from the most object-side surface of said zoom lens system to the image plane.

8. A zoom lens system comprising a positive first lens group, a positive second lens group, a diaphragm, and a negative third lens group, in this order from an object, wherein each of said first through third lens groups move in an optical axis direction to perform zooming;
wherein said positive first lens group comprises a negative lens element, and at least one positive lens element;
wherein said negative lens element is positioned at the most object-side of said positive first lens group, and is provided with a concave surface on the object-side surface of said negative lens element; and
wherein said zoom lens system satisfies the following conditions:

$$-0.811 \leq r1/fW < -0.5$$

$$45 < vp-vn$$

$$0.05 < LD2^{fT} < 0.09$$

wherein
r1 designates the radius of curvature of the object-side surface of the negative lens element in said positive first lens group;
fW designates the focal length of the entire zoom lens system at the short focal length extremity;
fT designates the focal length of the entire zoom lens system at the long focal length extremity;
vp designates the average Abbe number of said positive lens element in said positive first lens group;
vn designates the average Abbe number of said negative lens element in said positive first lens group; and
LD2 designates the distance, along the optical axis in the positive second lens group, from the most object-side surface thereof to the most image-side surface thereof.

9. The zoom lens system according to claim 8, further satisfying the following conditions:

$$2.4<fT/f1<3.5$$

$$5.0<fT/f2\ 7.0$$

$$-12.0<fT/f3<-8.5$$

wherein
f1 designates the focal length of said positive first lens group;
f2 designates the focal length of said positive second lens group; and
f3 designates the focal length of said negative third lens group.

10. The zoom lens system according to claim 8, wherein said positive first lens group comprises a negative lens element having a concave surface on the object-side surface thereof, and a positive biconvex lens element, in this order from said object.

11. The zoom lens system according to claim 8, wherein said negative third lens group comprises a positive lens element having a convex surface on the image-side surface thereof, and a negative lens element having a concave surface on the object-side surface thereof, in this order from said object.

12. The zoom lens system according to claim 8, further satisfying the following condition:

$$Z>4.5$$

wherein
Z=fT/fW.

13. The zoom lens system according to claim 8, further satisfying the following condition:

$$TL_T/fT \leq 0.71$$

wherein
$TL_T$ designates the distance, along the optical axis at the long focal length extremity, from the most object-side surface of said zoom lens system to the image plane.

* * * * *